US008565905B2

(12) United States Patent
Engelen

(10) Patent No.: US 8,565,905 B2
(45) Date of Patent: Oct. 22, 2013

(54) METHOD AND COMPUTER IMPLEMENTED APPARATUS FOR LIGHTING EXPERIENCE TRANSLATION

(75) Inventor: Dirk Valentinus Rene Engelen, Heusden-Zolder (BE)

(73) Assignee: Koninklijke Philips N.V., Eindhoven (NL)

( * ) Notice: Subject to any disclaimer, the term of this patent is extended or adjusted under 35 U.S.C. 154(b) by 208 days.

(21) Appl. No.: 13/002,561

(22) PCT Filed: Jul. 9, 2009

(86) PCT No.: PCT/IB2009/052852

§ 371 (c)(1),
(2), (4) Date: Jan. 4, 2011

(87) PCT Pub. No.: WO2010/004480

PCT Pub. Date: Jan. 14, 2010

(65) Prior Publication Data

US 2011/0109250 A1 May 12, 2011

(30) Foreign Application Priority Data

Jul. 11, 2008 (EP) .................................... 08104725

(51) Int. Cl.
*G05B 19/42* (2006.01)
*G06F 17/50* (2006.01)
*G06F 9/45* (2006.01)
*F21V 33/00* (2006.01)

(52) U.S. Cl.
USPC .................... 700/86; 703/1; 717/136; 362/85

(58) Field of Classification Search
USPC ........... 700/83, 86; 703/1; 715/700, 762, 763; 717/136–138, 140; 315/312, 361; 362/85
See application file for complete search history.

(56) References Cited

U.S. PATENT DOCUMENTS 5,307,295 A * 4/1994 Taylor et al. ...................... 703/1
5,769,527 A * 6/1998 Taylor et al. .................... 362/85

(Continued)

FOREIGN PATENT DOCUMENTS

WO 2005084339 A2 9/2005
WO 2007069143 A2 6/2007

(Continued)

OTHER PUBLICATIONS

Hardisty et al: "Cartographic Animation in Three Dimensions:Experimenting With the Scene Graph"; Geo Vista Center, 8 Page Document.

(Continued)

*Primary Examiner* — Crystal J Barnes-Bullock
(74) *Attorney, Agent, or Firm* — John F. Salazar; Mark L. Beloborodov

(57) ABSTRACT

The invention relates to the translation of lighting experience, particularly to the translation of scripts for describing lighting experiences and provided for controlling of lighting devices in a lighting system. An embodiment of the invention provides a method for lighting experience translation by means of a computer, comprising the acts of—receiving an effect based script, which describes one or more light effects of the lighting experience on one or more locations in a view in an environment (S10),—receiving one or more location-effect control models, wherein a location-effect control model describes light effects being available on a location in the view in the environment (S12), and—translating the effect based script into controls for one or more virtual lighting devices by using the location effect control model (S14). This allows to design lighting infrastructure independent effect based scripts and to translate the light experience, described with such scripts, automated into controls for virtual lighting devices, which may then further processed for a concrete lighting infrastructure.

7 Claims, 6 Drawing Sheets

(56) References Cited

U.S. PATENT DOCUMENTS

| | | | | |
|---|---|---|---|---|
| 7,231,060 | B2 * | 6/2007 | Dowling et al. | 382/100 |
| 7,495,671 | B2 * | 2/2009 | Chemel et al. | 345/594 |
| 8,346,376 | B2 * | 1/2013 | Engelen et al. | 700/12 |
| 2005/0248299 | A1 | 11/2005 | Chemel et al. | |
| 2008/0136334 | A1 * | 6/2008 | Robinson et al. | 315/151 |
| 2010/0049476 | A1 * | 2/2010 | Engelen et al. | 703/1 |
| 2010/0079091 | A1 * | 4/2010 | Deixler et al. | 315/320 |
| 2010/0090617 | A1 * | 4/2010 | Verberkt et al. | 315/297 |
| 2010/0134050 | A1 * | 6/2010 | Engellen et al. | 315/312 |
| 2010/0318201 | A1 * | 12/2010 | Cuppen et al. | 700/90 |
| 2010/0321284 | A1 * | 12/2010 | Kwisthout | 345/102 |

FOREIGN PATENT DOCUMENTS

| | | | |
|---|---|---|---|
| WO | 2008038188 | A2 | 4/2008 |
| WO | 2008078286 | A1 | 7/2008 |

OTHER PUBLICATIONS

Wheatley, C.: “Scriptable Scene-Graph Based Opengl Rendering Engine”; Masters Thesis, MSC Computer Animation, N.C.C.A. Bournemouth University, Sep. 2005, 45 Page Document.

* cited by examiner

METHOD AND COMPUTER IMPLEMENTED APPARATUS FOR LIGHTING EXPERIENCE TRANSLATION

FIELD OF THE INVENTION

The invention relates to the translation of lighting experience, particularly to the translation of scripts for describing lighting experiences and provided for controlling of lighting devices in a lighting system.

BACKGROUND OF THE INVENTION

With the introduction of LED based lighting in home and professional environments, people will have the possibility to create and change the perceived atmosphere of the environment. People know the possibility of dimming the lighting level and switching on spotlights to increase the cosines in the environment. On short term, they will have the possibility to create more atmospheres by using LED lighting on walls and objects, by changing the color temperature of the ambient lighting in the room, or by creating spots of lights to support their activities. The increase in possibilities is at the cost of an increase in the amount of controls. With LED lighting, it is also possible to create color gradients on a wall by addressing the individual LED-groups of a luminary. Also this is at the cost of having more controls.

Currently, atmospheres can be provided by programming the lighting infrastructure with scenes: every scene contains the control values of the lamps and lamp groups. When activating a scene, these controls are sent to the lamps and lamp groups. But when the amount of controls increases, it becomes more difficult to determine and fine-tune individual lamps, to create a balanced and appealing light setting. The approach of controlling individual lamps will change.

In some lighting systems such as the amBX™ implementation of the Applicant, which may create an ambient lighting experience depending on for example a computer game, an approach is used where the lighting atmosphere or desired lighting experience is determined by the specification of controls for a specific device. For controlling an amBX™ device such as a LED wallwasher a so-called asset is used. An asset is a short script in XML (Extended Markup Language), which specifies the creation of a certain light effect with the addressed amBX™ device. However, this approach is restricted to a specific device and depends on the device location. Thus, the lighting experience to be created depends on the specific lighting infrastructure, particularly on the available lighting devices and their capabilities. A transfer of scripts designed for creating a desired lighting experience to a different lighting infrastructure is very costly and complicated.

SUMMARY OF THE INVENTION

It is an object of the present invention to provide a method and computer implemented apparatus for lighting experience translation, which allows to automatically translating scripts designed for creating a lighting experience such that the scripts are applicable to different lighting infrastructures.

The object is solved by the subject matter of the independent claims. Further embodiments are shown by the dependent claims.

A basic idea of the invention is to replace the relation device-location, as it is usually applied in current scripting languages for controlling lighting systems, with a relation device-view-location. By introducing the concept of the view, a lighting system implementation independent design of effect based scripts is possible. Further, these effect based and implementation independent scripts may be automatically translated for application with a concrete implementation of a lighting system. The view may be regarded as a kind of intermediate abstraction layer between the abstract descriptions of light effects in the effect based scripts and control values for a concrete implementation of a lighting system, as it is used presently for example in amBX™ asset.

An embodiment of the invention provides a method for lighting experience translation by means of a computer, comprising the acts of

- receiving an effect based script, which describes one or more light effects of the lighting experience on one or more locations in a view in an environment,
- receiving one or more location-effect control models, wherein a location-effect control model describes light effects being available on a location in the view in the environment, and
- translating the effect based script into controls for one or more virtual lighting devices by using the location effect control model.

An effect based script does not contain the control values of a concrete lighting unit or device of a lighting system as for example an amBX™ asset, but only a description of a light effect of the lighting experience on a location, such as for example red lighting in the middle part of the view, or yellow lighting in the lower middle part of the view with a color gradient to red lighting to the left and right of the middle part. A location-effect model contains substantially the available light effects and is related to a concrete implementation of a lighting system. It may be regarded as kind of inventory description of the environment. With both the effect based scripts and the location-effect control models, a translation into controls for virtual lighting devices may be performed. The virtual lighting devices may then later be mapped to concrete lighting devices, which may be an automatic computerized process. The controls may be described in a control based script for a lighting system.

According to a further embodiment of the invention, the act of translating the effect based script into controls for one or more virtual lighting devices by using the location effect control model may comprise

- placing a light effect, which is described in the effect based script, into a shape that defines the location of the light effect in the view,
- deriving color and intensity values from the shape containing the light effect, and
- deriving controls for a virtual lighting device of the environment from the color and intensity values.

The shape may be for example a rectangle or an ellipse automatically placed in the view. This shape may then be analyzed for deriving the color and intensity values, which depend on the light effect in the shape. Afterwards, the controls for a virtual lighting device may be derived from the color and intensity values. For example a light effect "sunrise" may be placed in a rectangle located the lower middle part of a view. Sample points in the shape may be used to derive the color and intensity values of "sunrise", for example yellow with an increasing intensity. Afterwards, the respective controls for a virtual lighting device, which may be assigned to the shape, are derived.

The view may be in an embodiment of the invention a real or virtual surface in the environment. A real view may be for example a wall in a room, which may be lightened by LED wallwashers. A virtual view may be a virtual plain in the environment, which may be used to specify light effects in the virtual plain.

A light effect may be in an embodiment of the invention described in the effect based script by specifying a 2-dimensional distribution of light values. For example, a grid of sample points in the view as 2-dimensional distribution of light values may be used. Each sample point may specify for example a color and intensity tuple. By using a limited number of sample points for describing a light effect, the amount of data may be reduced.

According to a further embodiment of the invention, all light effects being available on the same location in the view in the environment may be described by a virtual lighting device in a location-effect control model. Thus, also the location-effect control models may be device-independent and may be for example generated by a computer program, for example a lighting control program being adapted to automatically generate the location-effect control models as output of a lighting designer program.

The method may further comprise in an embodiment of the invention the acts of

- replacing the controls for a virtual lighting device into controls of a lighting infrastructure and
- sending the controls of the lighting infrastructure to lighting devices.

Thus, the controls for a virtual lighting device as for example contained in a control based script, which was generated as output of the translation process, may be in a further act converted in controls of the lighting infrastructure, for example by a lighting experience engine, which is provided for a concrete implementation of the lighting infrastructure.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention provides a computer programmed to perform a method according to the invention such as a PC (Personal Computer), which may be applied to translate a lighting experience described in one or more effect-based scripts independent from a concrete lighting infrastructure into controls for virtual lighting devices, which may further converted for application with the concrete lighting infrastructure.

A further embodiment of the invention provides a computer implemented apparatus for lighting experience translation being adapted to

- receive an effect based script, which describes one or more light effects of the lighting experience on one or more locations in a view in an environment,
- receive one or more location-effect control models, wherein a location-effect control model describes light effects being available on a location in the view in the environment, and comprising
- a script translation service being adapted to translate the effect based script into controls for one or more virtual lighting devices by using the location effect control model.

The apparatus may be in an embodiment of the invention being adapted to perform a method of the invention and as described above.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
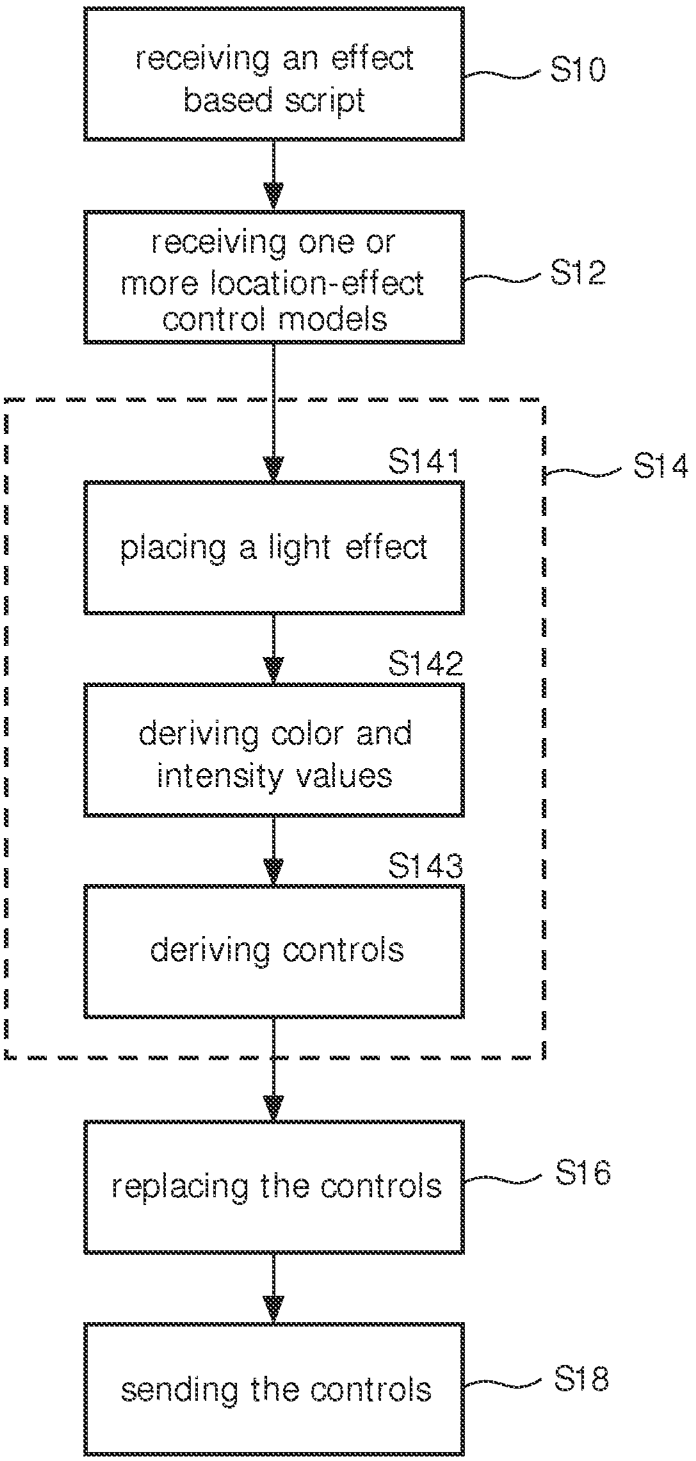
FIG. 1 shows a flow chart of an embodiment of a method for lighting experience translation by means of a computer.

In the following, functionally similar or identical elements may have the same reference numerals. Embodiments of the invention are explained in the following by example of the amBX™ system of the Applicant, particularly by example of wallwashers. However, the following description may not be understood as limiting the invention to amBX™ systems or wallwashers. The present invention may be applied to any kind of lighting experience translation, which uses scripts for specifying light effects in lighting infrastructures or systems.

In the amBX™ system of the Applicant, amBX™ scripts are used to drive a set of audio, light and other devices, to augment the experience when watching television, playing a game or creating an atmosphere in a room. In the current amBX™ implementation, an approach is used where the atmosphere or desired experience is determined by the specification of controls for a specific device type. Colored light in amBX™ can be generated by sending three values (percentage for red, green and blue) to a device of type RGB light. These values are stored in amBX™ assets, which are XML specifications. For every desired effect (or state as it is called in amBX™) an asset has to be created. An example of such an asset that creates a red effect is:

```
<asset>
<state red_one>
<type rgb_light>
<value 90 0 0>
</asset>
```

Figure 3:
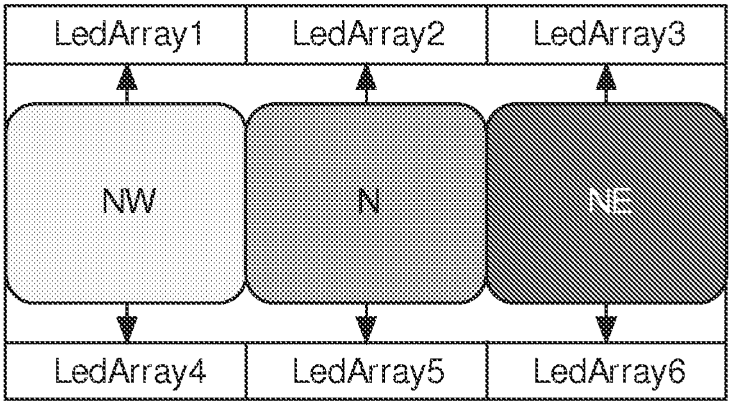
FIG. 3 shows a device-location association in an amBX™ lighting system.

In amBX™, devices are also associated to locations in the environment. Every device is associated to one location. FIG. 3 gives an example for a wallwasher lighting device. The wall is illuminated by 6 wallwash devices LedArray1-LedArray6. Every device is associated to an amBX™ location. LedArray3 and LedArray6 both are associated to the Northeast NE location, LedArray1 and LedArray4 to the Northwest NW location, and LedArray2 and LedArray5 to the North N location. When the wallwash devices LedArray3 and LedArray6 are driven by the values in the above described asset “red_one”, they produce a red effect on the wall.

Figure 4:
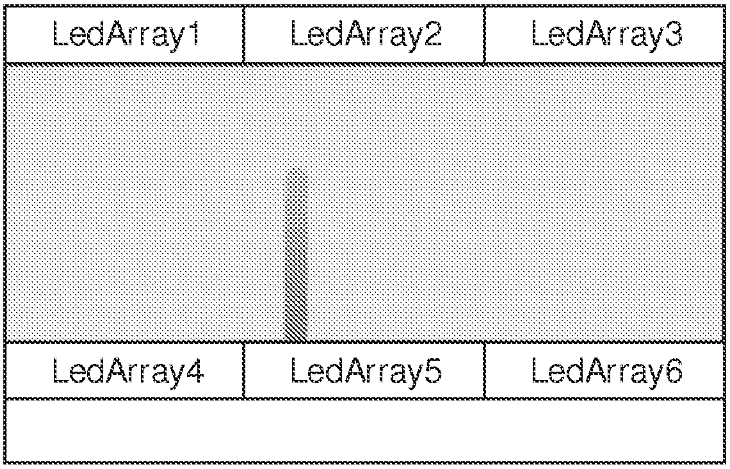
FIG. 4 shows the effect of LED groups or arrays illuminating a wall.

FIG. 4 shows a finger like effect on the wall created with a device that supports the creation of color gradients on the wall. In stead of a single RGB-triple, this device is driven by multiple RGB-triples that create finger like effects on the wall. This means that assets for single RGB lights have to be translated into assets for these n-RGB lights, or special assets for these devices have to be provided by application developers. The device manufacturers on the other hand will have a problem in going from a single RGB value to a gradient with multiple RGB values. They have to interpret the assets to see which other colors have to be used to produce an effect that is relevant for the application (e.g. the orange of an asset should be converted to a yellow-to-red transition if the asset is used for a sunset atmosphere).

Figure 5:
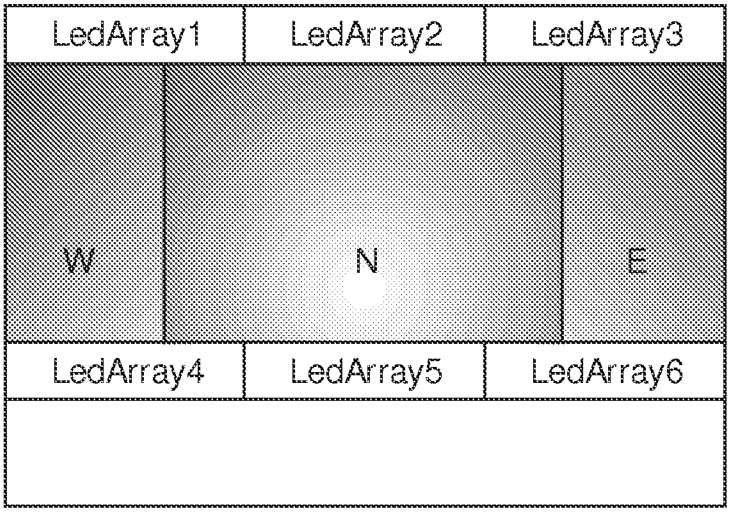
FIG. 5 shows a desired light effect on a wall and LED arrays to generate the light effect.

Lighting infrastructures of the future will also be able to create effects like the one illustrated in FIG. 5. FIG. 5 shows a light effect created by wallwashers with a brighter lighting in the middle of the North N location, which becomes darker to the West W and East E locations, similar to for example a sunset (when the brighter lighting is yellow and the darker lighting is red). For a number of reasons, this light effect cannot be specified in the current amBX™ approach:

- The device type RGB light only supports a single color for every location. However, in the lighting shown in FIG. 5, the North N location has multiple colors.
- Every amBX™ device produces an effect in a single location. In the lighting shown in FIG. 5, LedArray1 produces its effect in both the West W and North N location.
- In amBX™, two devices in the same location receive the same control values. In the lighting shown in FIG. 5, LedArray2 and LedArray5 have to be driven differently because the effect in the lower part of the location is different from the upper part.

The above requires the creation of device specific amBX™ assets, which is very costly and complicated.

Figure 6:
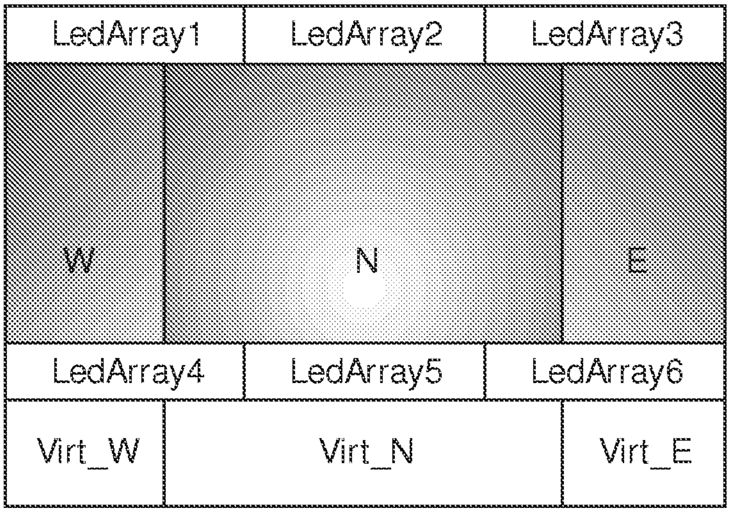
FIG. 6 shows virtual devices derived from a location model of the desired light effect shown in FIG. 5.

The following three features according to the present invention may help to solve this problem:

- The relation device-location is replaced by a relation device—view—location. A view is a real or imaginary plane in the environment. In this view, locations are indicated by the user or installer of a lighting system. By using methods like Dark Room Calibration, the effect of every control of the device on the view can be measured or modeled. In order to obtain a target effect in the view, modeling methods can calculate the controls for the lamps.
- Instead of specifying controls in the assets, the desired effects on the locations in the view are specified. The effects are specified as small, 2-dimensional distributions of color codes (in RGB or xyY or the like) or light intensity values. The size of the effect can vary from a single point to an m by n matrix of values. An asset that contains an effect is called in the following a high level asset.
- Finally, all controls that have their effect in the same location may be grouped in a virtual device. This is depicted in FIG. 6, where some controls of devices LedArray1 and LedArray4 are aggregated in virtual device Virt_W, which produces its effect in the West area.

By using these features, it is possible to define a script translation service, which translates high level assets into a (amBX™ compliant) script containing controls for the virtual devices. The latter may be automatically converted into light controls for a specific lighting infrastructure, as will be explained in the following in more detail.

Figure 7:
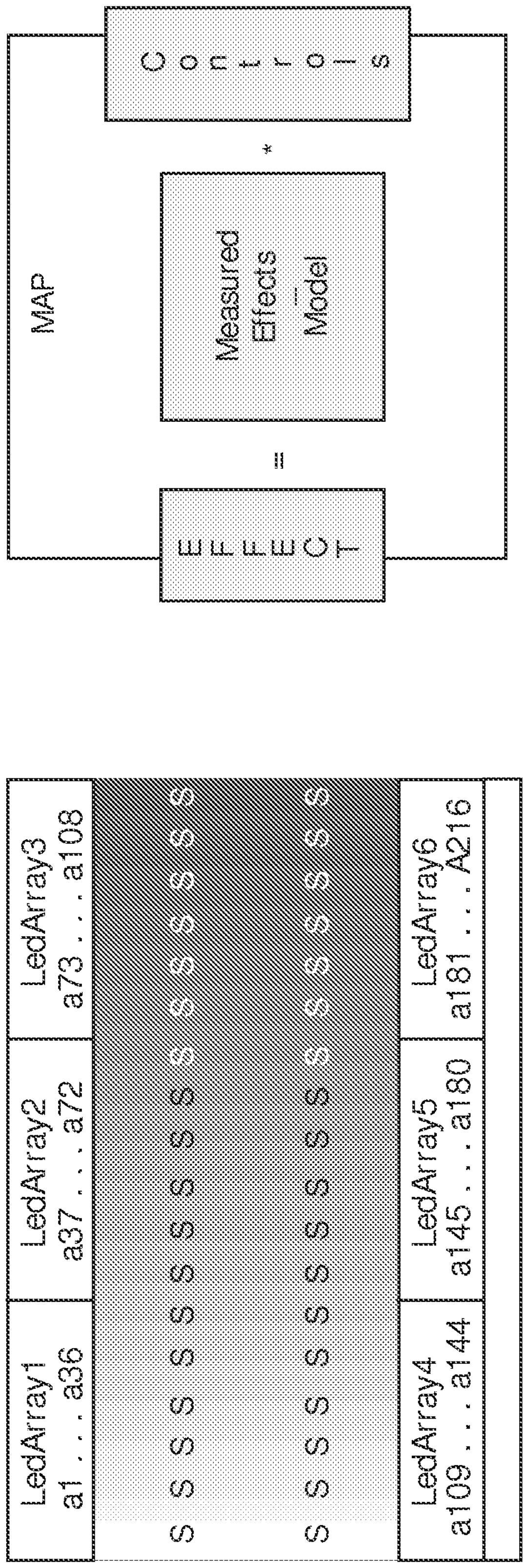
FIG. 7 shows the relation of the desired light effect shown in FIG. 5 to lighting control values.

With regard to the wallwash example shown in FIG. 7, it is explained how the controls of a lighting infrastructure can be derived from a color/intensity distribution in a view on a real or virtual surface. A wall is lighted by six LED-based luminaries LedArray1-LedArray6, which have 12 LED groups each. Every LED group is controlled by three values for the red, green and blue color. This means there are 36 controls for every luminary LedArray1-LedArray6, and 216 controls a1 . . . a216 for illuminating the complete wall. With this infrastructure, a light scene with different colors and intensities can be created on the wall. The wall can be considered as a real view, sample points “s” can be placed in this view, and the effect of every control of the infrastructure on this wall (or view) can be measured or modeled. This results in a relation or model between the controls and the effect on the wall. The model represents a system function and is shown in the right of FIG. 7, wherein a light effect on the wall is modeled by “multiplying” the controls with the model of measured effects. By using sample points “s”, the dimension of the model may be reduced. This model is called the view-effect-control model, because it describes how every control is related to the effect it produces on the view. The controls for the light infrastructure can be derived from a desired color/intensity distribution on the wall. (e.g. specified for example in CIE xyY values).

In this view (on the wall), locations can be indicated. This is illustrated in FIG. 6, where some locations of a compass like a location model are indicated. Based on the relation between location and view, the controls of the devices can be grouped, such that each control is assigned to the location where the effect is most significant. By doing this, the controls can be aggregated into a set of controls for virtual devices that are assigned to a single location.

Figure 8:
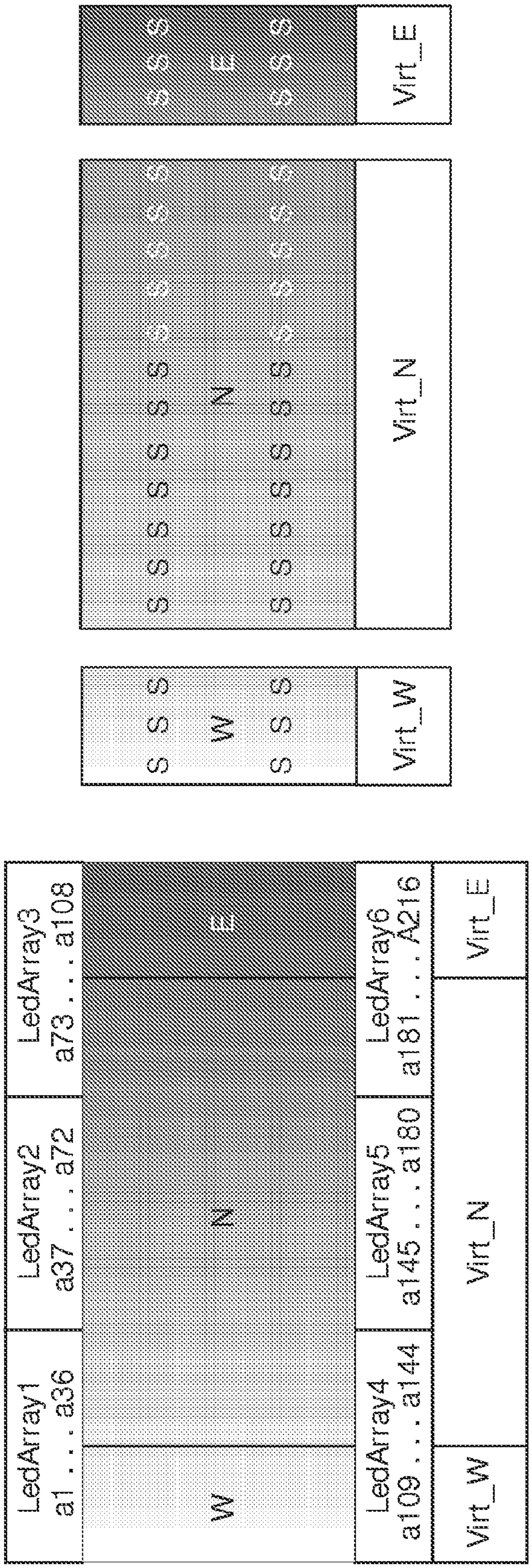
FIG. 8 shows a location model of the desired light effect shown in FIG. 5 and a split of the location model into virtual lighting devices.

This is now explained with regard to FIG. 8. The wall view in FIG. 8 is split into 3 locations W West), N (North), E (East), as shown in the right of FIG. 8. The West location W is effected by half of LedArray1 and half of LedArray4. The controls a1 . . . a18 and a109 . . . a126 are grouped into a virtual device Virt_W that is assigned to the West location. This virtual device Virt_W can be controlled in an effect driven way by a color/intensity distribution in the small rectangle designated W. Similarly, the North and East locations N and E, respectively, are grouped into virtual devices Virt_N and Virt_E, respectively. When taking the sample points into account, a sub model (Location-Effect-Control Model) can be derived from the View-Effect-Control model.

The assets in the application or effect based scripts can now include color/intensity distributions that have to be rendered on the locations. For every relevant location W, N and E, where the color/intensity distribution should be rendered, the distribution is converted into controls for the virtual device of the location. This automatic conversion process is shown by means of the flowchart of FIG. 1. In step S10, an effect based script is received from a script translation service, which is executed by a computer. Then, in step S12, one or more location-effect control models are received, which describe light effects being available on locations in the view in the environment. The translation process is performed in step S14. The color/intensity distribution from the effect based script is placed into the shape, for example a rectangle that defines the location in the view (step S141). Then, desired color/intensity values are derived for the sample points (step S142). From these values, controls for the virtual device are derived (step S143). All these calculations can be done offline, for a specific light infrastructure. Converted scripts are not useful for other lighting configurations: this protects the ownership of light scripts, because the original effect based scripts do not leave the environment controlled by the atmosphere and experience provider service. Only the converted scripts may be for example sent to the home users from a light experience translation service provider.

These converted scripts can be executed on the current state of the art of amBX™ engines. When assets have to be activated, the pre-calculated control values are sent to the virtual device. A demultiplexer component replaces the addresses of the virtual device to the addresses of the lighting infrastructure (step S16), and sends the values to the lamps (step S18).

Figure 2:
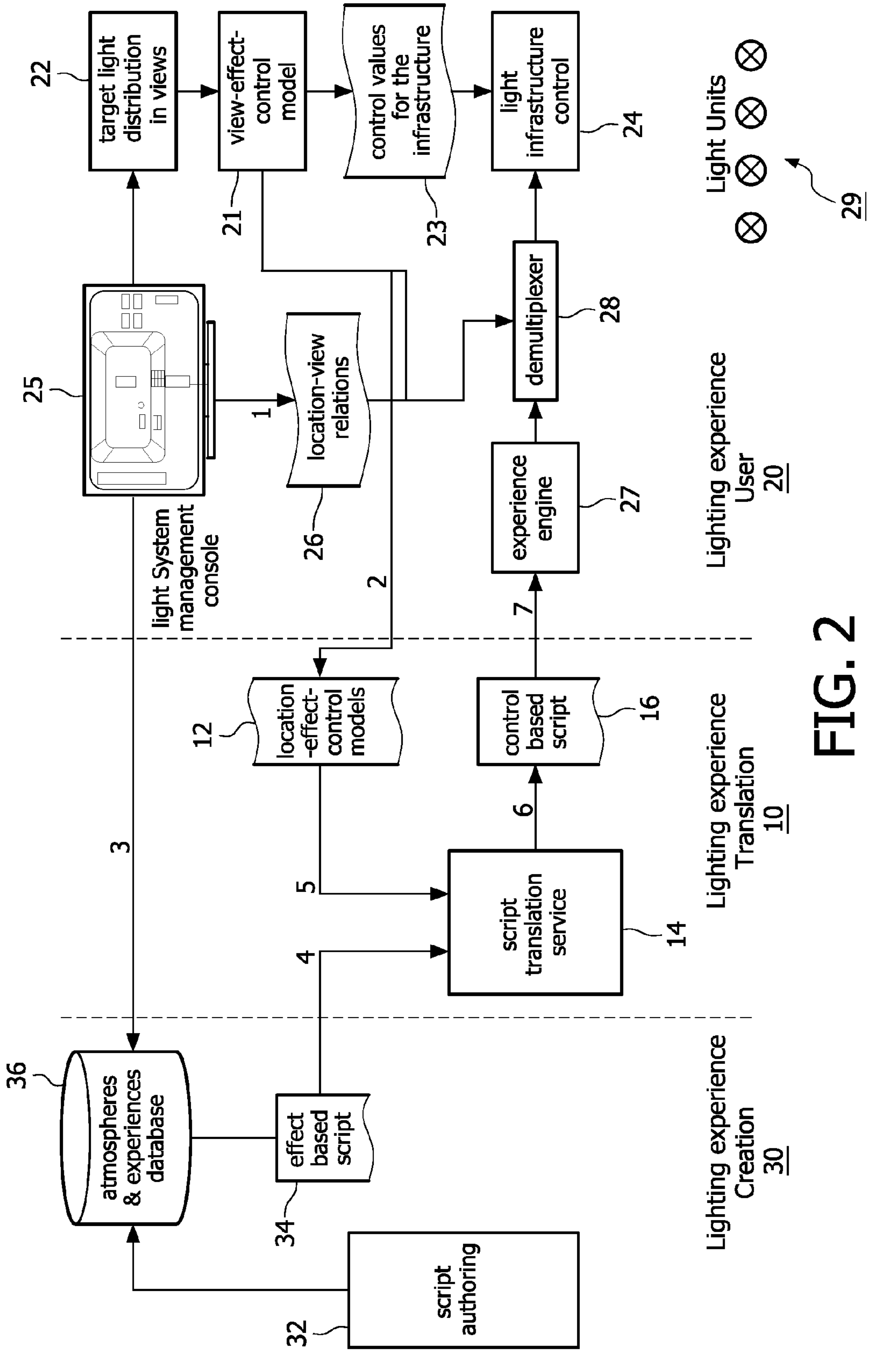
FIG. 2 shows an embodiment of a system for light experience creation comprising an embodiment of a computer implemented apparatus for controlling a lighting infrastructure according to the invention.

An overview of a possible embodiment of a system for light experience creation comprising an embodiment of a computer implemented apparatus 10 for controlling a lighting infrastructure according to the invention is shown in FIG. 2. The right side presents the environment of a user who would like to have atmosphere lighting in his living room or who would like to have an experience where lighting is involved. This user has a lighting management system 20, which controls all the lights. The effect of the lights on the environment is measured and modeled in the view-effect-control model 21. The user can control the lighting by creating a target light distribution 22, which may be translated by the view-effect-control model 21 to the control values 23 for the light infrastructure, which are then sent to the light infrastructure control 24.

The user can also use a light system management console 25 of the light management system 20 to indicate important locations in the views and give them a name (1). It is also possible that some software suggests a location model that is placed on top of the view. Then the user has the possibility to fine-tune this. This result in a set of location-view relations 26, from which a set of virtual devices can be derived (one virtual device for every location). The view-effect-control model 21 can be split up into a set of location-effect-control models 12, one for every virtual device (2).

The left hand side represents the lighting experience creation 30. An authoring tool 32 for generating experiences creates effect based scripts 34 that specify how a certain lighting atmosphere will look like. This effect is specified as a 2 dimensional distribution of colors and intensities. Light effect or effect based scripts 34 are stored in a database 36 (e.g. a database of light atmospheres) for later retrieval.

In the middle, the script translation service 14 is shown which translates an effect based script 34 into a control based script 16 that contains the controls for a specific lighting infrastructure. This translation is done by using the location-effect-control models 12. When the user selects an atmosphere or experience script 34 from the database 36 (3), the script is sent to the script translation service 14 (4). The script translation service 14 also receives the location-effect-control models 12, and translates all the effect based assets in the script 34 into controls for the virtual devices. This results in a control based script 16 that is sent to the light management system 20 (7).

The translated script 16 is processed by an experience engine 27 for example a state of the art amBX™ engine of the light management system 20, which sends the controls to a demultiplexer 28 based on the timing and conditions in the script 16. The demultiplexer 28 uses the information about the virtual devices and the location-view relations 26 to translate the addresses of the virtual devices into the real addresses of the lighting controls. Addresses and control values are then sent to the light infrastructure control 24 which drives the light units 29.

The script translation for lighting can be applied in all areas where lighting is used to create atmospheres and experiences on an open and diverse lighting infrastructure. The lighting experience user does not have to invest in a closed system, but can connect his lighting infrastructure to the experience engine. The atmosphere and experience scripts can enhance activities like partying, gaming or watching movies. The providers also can create theme atmospheres (cosy, activating, seasonal and time-of-the-day lighting). The script authors on the other hand are decoupled from the specific lights and the effects that they create in the environment. They can specify the desired light effects on a higher level, such that more light infrastructures are supported with less effort.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for lighting experience translation by means of a computer, comprising the acts of receiving an effect-based script, which describes one or more light effects of the lighting experience on one or more locations in a view in an environment, receiving one or more location-effect control models, wherein a location-effect control model describes light effects being available on a location in the view in the environment, translating the effect based script into physical device independent controls for one or more virtual lighting devices by using the location effect control model, placing a light effect, which is described in the effect based script, into a shape that defines the location of the light effect in the view, deriving color and intensity values from the shape containing the light effect, and deriving controls for a virtual lighting device of the environment from the color and intensity values.

2. The method of claim 1, wherein the view is a real or virtual surface in the environment.

3. The method of claim 1, wherein a light effect is described in the effect based script by specifying a 2-dimensional distribution of light values.

4. The method of claim 1, wherein all light effects being available on the same location in the view in the environment are described by a virtual lighting device in a location-effect control model.

5. The method of claim 1, further comprising the acts of replacing the controls for a virtual lighting device into controls of a lighting infrastructure (S16) and sending the controls of the lighting infrastructure to lighting devices (S18).

6. A computer implemented apparatus (10) for lighting experience translation being adapted to receive an effect based script (34), which describes one or more light effects of the lighting experience on one or more locations in a view in an environment, receive one or more location-effect control models (12), wherein a location-effect control model describes light effects being available on a location in the view in the environment, and comprising a script translation service (14) being adapted to translate the effect based script into controls (16) for one or more virtual lighting devices by using the location effect control model.

7. A method for lighting experience translation on a computer, comprising:

receiving an effect based script which describes one or more abstract descriptions of light effects of a light experience on one or more locations in a view in an environment;

receiving one or more location-effect control models wherein the location-effect control model describes a plurality of light effects being available on a location in the view in the environment;

translating the effect based script by a script translation service to translate the effect based script into controls for one or more virtual lighting devices by using the location effect control model;

replacing the controls for the one or more virtual lighting devices into controls of a lighting infrastructure.

* * * * *